(12) United States Patent
Zaina et al.

(10) Patent No.: US 7,283,718 B2
(45) Date of Patent: Oct. 16, 2007

(54) OPTICAL CONNECTOR WITH PROTECTIVE COVER AND LEAF SPRING

(75) Inventors: Patrick Zaina, Wil (CH); Urs Frischknecht, Herisau (CH)

(73) Assignee: Huber+Suhner AG, Herisau (CH)

( * ) Notice: Subject to any disclaimer, the term of this patent is extended or adjusted under 35 U.S.C. 154(b) by 102 days.

(21) Appl. No.: 10/514,380

(22) PCT Filed: Feb. 18, 2003

(86) PCT No.: PCT/CH03/00119

§ 371 (c)(1),
(2), (4) Date: Nov. 12, 2004

(87) PCT Pub. No.: WO03/096092

PCT Pub. Date: Nov. 20, 2003

(65) Prior Publication Data

US 2005/0147358 A1    Jul. 7, 2005

(30) Foreign Application Priority Data

May 14, 2002    (CH) .................... 804/02

(51) Int. Cl.
*G02B 6/00* (2006.01)
*G02B 6/36* (2006.01)

(52) U.S. Cl. .................... 385/139; 385/76; 385/78; 385/88

(58) Field of Classification Search ............ 385/76–78, 385/88, 90–92, 139
See application file for complete search history.

(56) References Cited

U.S. PATENT DOCUMENTS

| 5,363,460 | A | * | 11/1994 | Marazzi et al. ............... 385/70 |
| 5,845,036 | A | * | 12/1998 | De Marchi ................. 385/139 |
| 5,883,995 | A | | 3/1999 | Lu |
| 5,940,560 | A | * | 8/1999 | De Marchi et al. ........... 385/58 |
| 6,041,155 | A | * | 3/2000 | Anderson et al. ........... 385/139 |
| 6,142,676 | A | * | 11/2000 | Lu ............................. 385/60 |
| 6,206,577 | B1 | * | 3/2001 | Hall et al. .................... 385/53 |
| 2004/0234207 | A1 | * | 11/2004 | Holmquist .................. 385/75 |

FOREIGN PATENT DOCUMENTS

| EP | 0 570 652 A2 | 11/1993 |
| EP | 1 072 917 A1 | 1/2001 |

* cited by examiner

*Primary Examiner*—Frank G. Font
*Assistant Examiner*—Derek L. Dupuis
(74) *Attorney, Agent, or Firm*—The Webb Law Firm

(57) ABSTRACT

The invention relates to an optical connector for connecting optical fibers. Said connector comprises a housing which is provided with a first opening for an optical cable comprising an optical fiber to be connected, and a second opening, through which the end of the optical fiber outwardly protrudes from the housing. The second opening can be closed by a lid which can be pivoted between a first position in which it closes the second opening, and a second position in which it frees the second opening. Spring elements are provided for prestressing the lid in the closing direction. The aim of the invention is to simplify the structure and especially the assembly of one such connector. To this end, the spring elements comprise a laminated spring.

23 Claims, 4 Drawing Sheets

OPTICAL CONNECTOR WITH PROTECTIVE COVER AND LEAF SPRING

BACKGROUND OF THE INVENTION

Field of the Invention

The present invention relates to the field of optical plug-in connections.

Description of Related Art

In fiber-optic communications technology, use has long been made of optical connector systems in which two optical fibers are coupled to each other by two connectors, in each of which one of the fibers ends in a ferrule, being inserted from opposite sides into a coupling or an adapter in such a way that the ferrules slide from both sides into a guiding sleeve arranged in the coupling and butt with the end faces against each other. Connector systems of this type are known and marketed under the designation SC, LC, E2000,LSH or LX.5.

In some of the known connector systems, the connectors are equipped with pivotable protective covers, which in the non-inserted state of the connector cover the opening from which the ferrule protrudes with the end of the fiber and so on the one hand protect the sensitive coupling-in surface of the optical fiber from being soiled or damaged and on the other hand prevent laser radiation that is guided in the optical fiber from penetrating to the outside and possibly causing personal injury. Optical connectors of this type that are provided with pivotable protective covers are disclosed for example in EP-B1-0 570 652, E-A1-0 823 649,EP-A1-1 072 917, U.S. Pat. No. 5,883,995 or the initially cited U.S. Pat. No. 6,142,676.

In principle, it is possible to actuate, or swing open and closed, the pivotable covers on the connectors without the aid of spring elements exclusively by the interaction of actuating elements arranged on the cover and in the coupling. Such spring-less solutions are described in U.S. Pat. No. 5,883,995 and in EP-B1-0 570 652.

In order to ensure that the covers are reliably closed and kept closed, however, spring elements which prestress the cover in the closing direction and consequently both bring about automatic closing and provide a resistance to counter opening of the cover, and so significantly reduce the risk of unintentional swinging open, are increasingly being used on the connectors.

In EP-A1-0 823 649, a cover which performs a combined pivoting and sliding movement is provided on the connector; during opening, it is initially swung open and then pushed linearly to the rear in the direction of the connector axis. In order to prestress the cover in the closing direction, a spiral spring which lies parallel to the connector axis and acts via a push rod (11 in FIG. 2) on a lever arm (12 in FIG. 2) formed onto the cover is provided in this case. A comparable mechanism is also shown in EP-A1-1 072 917.In both cases, the closed position of the cover is the only stable position. In any other position of the cover, the pressure of the spring always acts in the direction of this closed position.

Another situation is obtained with the solution of the initially cited U.S. Pat. No. 6,142,676 (FIG. 33 et seq). Although a spiral spring for acting on the cover is likewise provided here, the spiral spring is fastened with one end to the cover and seated with the other end on a pivotably mounted pin. At the same time, the cover performs a straightforward pivoting movement. This results in a kind of snap mechanism in which the cover can optionally assume two stable positions, that is the completely opened position and the completely closed position: if the cover is swung up out of the closed position, the spiral spring is increasingly compressed, until it is compressed to the maximum extent in a predetermined intermediate position of the cover. If the cover swings beyond the predetermined intermediate position, the spiral spring expands again. As a consequence of this, the cover is pressed by the spiral spring either into the opened position or into the closed position, depending on on which side of the predetermined intermediate position it is located at the time. The additional prestressing of the cover in the opened position has in this case the advantage in particular that the cover is optimally positioned during pulling out from the coupling for the subsequent closing movement.

Problems when spiral springs are used for prestressing the protective covers in the closing direction arise in particular because the spiral springs are difficult to handle during assembly and in particular cause problems in automated assembly. These problems become all the greater the smaller the connectors become. This applies in particular to the so-called SFF (Small Form Factor) connectors, as are described for example in the initially cited U.S. Pat. No. 6,142,676.

SUMMARY OF THE INVENTION

The object of the invention is to provide an optical connector on which the pivotable protective cover is prestressed in the closing direction by spring means and which can be assembled without difficulty, and in particular also automatically, even with further reduced dimensions.

The object is achieved by the features of claim 1 in their entirety. The essence of the invention is to use for the prestressing of the cover a leaf spring which, on account of its simple geometry and mode of operation, can be attached particularly easily to the connector and which is also suitable for equipping the cover with a bistable pivoting mechanism.

A first preferred configuration of the invention is distinguished by the fact that the leaf spring is restrained with its one end on the housing in a predetermined position of rest, that the leaf spring is arranged with its other, free end in relation to the cover in such a way that, during the pivoting of the cover from the first position into the second position, the leaf spring is bent with the free end out of its position of rest, that the optical fiber in the connector runs parallel to a connector axis, that the cover can be pivoted about a pivot axis lying transversely in relation to the connector axis, and that the leaf spring in its position of rest on the housing rests on a supporting surface, the surface normal of which is oriented perpendicularly in relation to the pivot axis and runs parallel to the connector axis. The arrangement of the leaf spring parallel to the connector axis allows a comparatively long leaf spring, which has a favorable spring characteristic for the actuation of the cover, to be accommodated on the connector. The resting on a supporting surface leads to stable restraint of the leaf spring and to high functional reliability.

According to a preferred development of the configuration, for restraining one end of the leaf spring on the housing, the leaf spring rests with the end on the supporting surface on the housing and is held down on the supporting surface by hold-down devices arranged above the supporting surface on the housing and extending parallel to the supporting surface, it being possible for the leaf spring to be pushed in between the supporting surface and the hold-down devices. This configuration ensures that the leaf springs can be pushed very easily in between the supporting surface and the hold-down devices during assembly.

The leaf spring is preferably secured on the supporting surface against lateral displacement by fixing means. The housing of the connector and the assembly of the leaf spring are in this case particularly easily configured if the fixing means comprise two offsets in the housing, which prevent movement of the leaf spring in the direction of the connector axis, if the fixing means further comprise a stop for the cover protruding perpendicularly upward out of the center of the supporting surface and extending in the direction of the connector axis, if the leaf spring has a slit-like clearance which is open to one side and receives the stop when the leaf spring is inserted into the housing, and if the hold-down devices are arranged laterally on the stop.

In order that the leaf spring can be assembled more easily, it is of advantage if the slit-like clearance in the leaf spring has a funnel-shaped widening toward the open side.

The interaction between the leaf spring and the cover preferably takes place by actuating elements, in particular in the form of studs, which describe a circular path during pivoting of the cover, being arranged on the cover, and by the leaf spring resting with its free end on the actuating elements or studs and being deflected by the actuating elements or studs when the cover is pivoted from the first position into the second position.

In this connection, a bistable pivoting mechanism for the cover can be realized by the actuating elements or studs being arranged on the cover in such a way that a maximum deflection of the leaf spring is achieved when the cover is in a predetermined pivoting position, which lies between the first position and the second position, and by the cover being pressed into the second position by the leaf spring when it has exceeded the predetermined pivoting position while coming from the first position.

Another preferred configuration of the invention is characterized in that the leaf spring is fixedly arranged with its one end in the cover itself and, during the pivoting of the cover, slides with a free end along on a sliding surface formed on the housing in such a way that the cover is prestressed in the closing direction. This type of arrangement is particularly advantageous if, according to a development, the leaf spring is fastened to the cover in such a way that, when the cover is closed, it intercepts radiation emerging from the optical fiber and the part of the leaf spring that lies in the path of rays of the optical fiber when the cover is closed is set obliquely in relation to the optical axis of the optical fiber in such a way that radiation impinging on the leaf spring from the optical fiber is not reflected back into the optical fiber.

BRIEF DESCRIPTION OF THE DRAWINGS

The invention is to be explained in more detail below on the basis of exemplary embodiments in conjunction with the drawing, in which.

DESCRIPTION OF THE PREFERRED EMBODIMENTS

Figure 1:
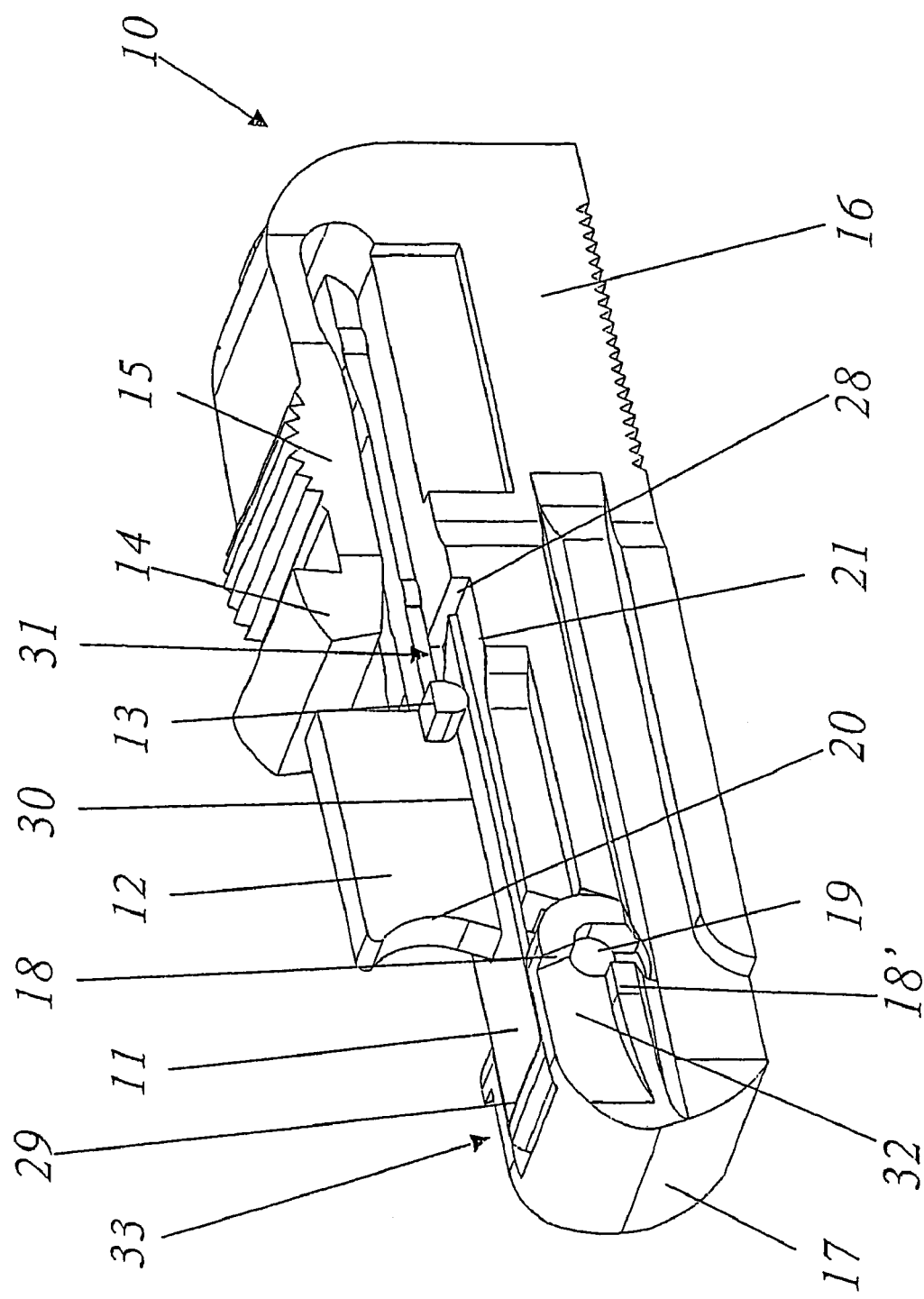
FIG. 1 shows in a perspective view, seen obliquely from the front, a preferred exemplary embodiment of a connector according to the invention in which the cover is located in the closed, first position.
Figure 2:
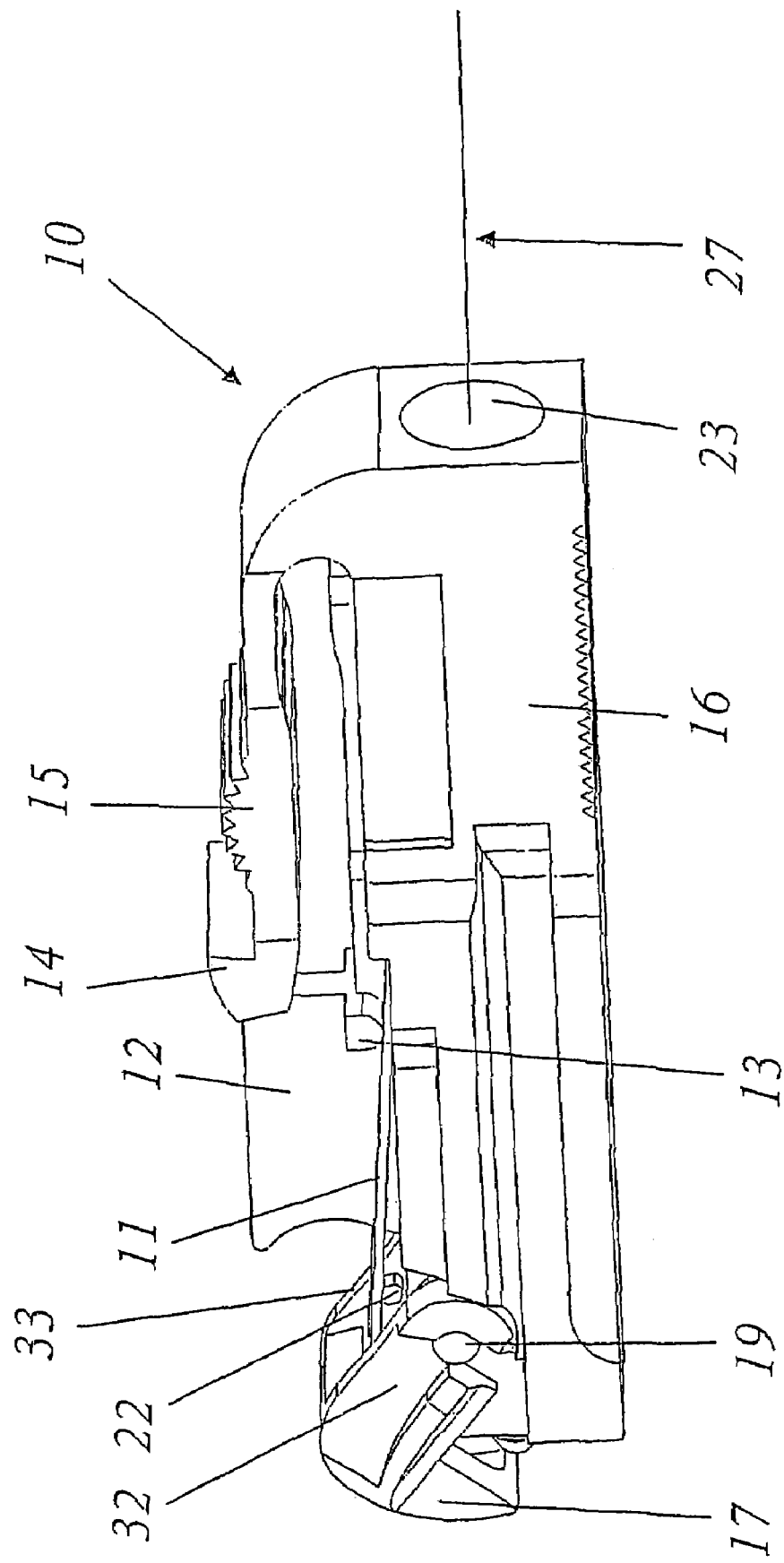
FIG. 2 shows in a perspective view, seen obliquely from the rear, the connector from FIG. 1 with the cover half swung open, with the maximum deflection of the leaf spring.
Figure 3:
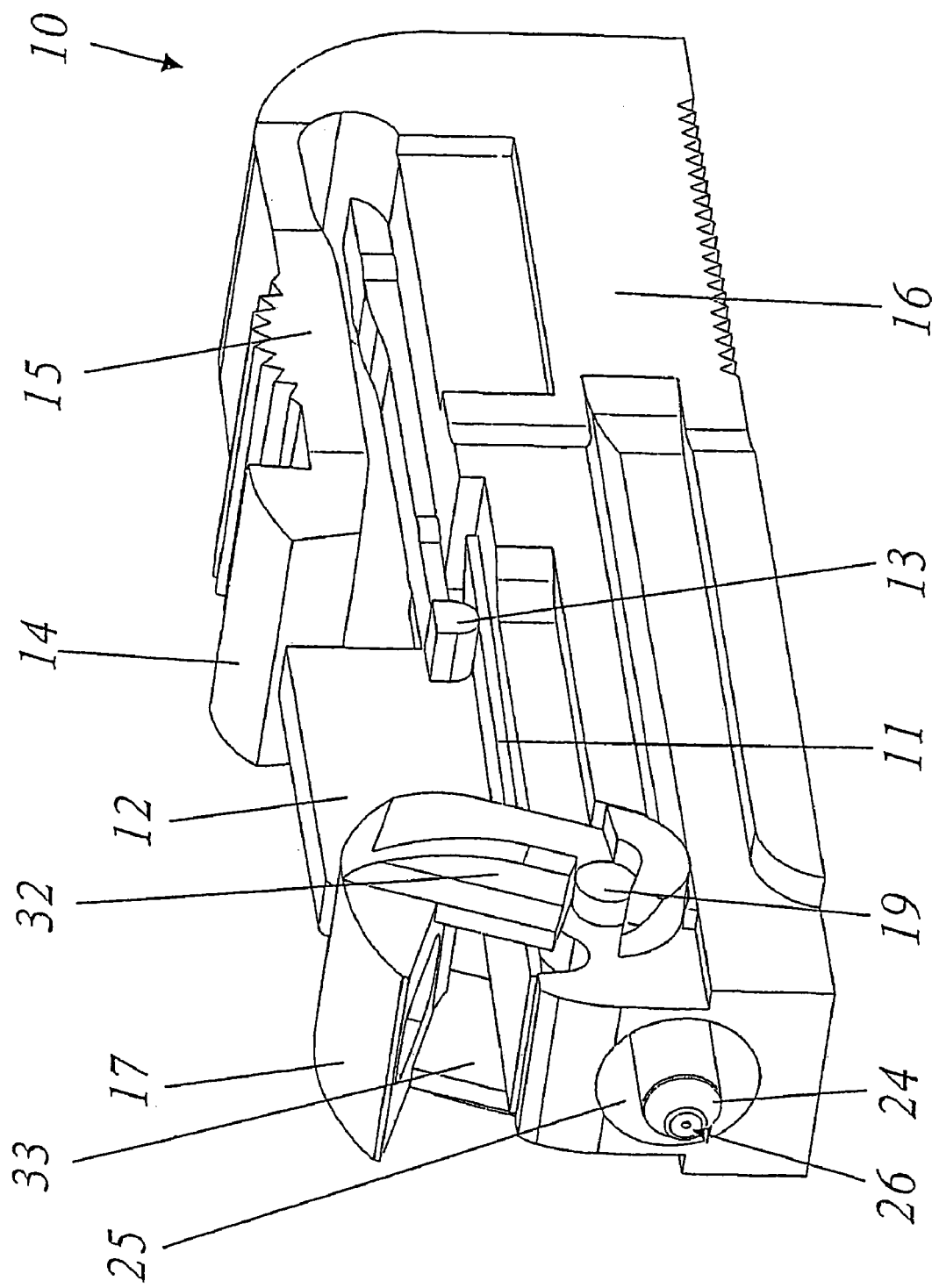
FIG. 3 shows in a representation comparable to FIG. 1 the connector from FIG. 1 with the cover in the completely swung-open, second position.

In FIGS. 1 to 3, a preferred exemplary embodiment of a connector 10 according to the invention is reproduced in a perspective representation, the cover 17 provided on the connector 10 assuming different positions in the figures. The connector 10 has a housing 16 made of a suitable plastic, through which there runs in the longitudinal direction, along a connector axis 27 (FIG. 2), a through-bore, which emerges to the outside at the rear end of the connector 10 in a first opening 23 (FIG. 2) and at the front end in a second opening 25 (FIG. 3). The cable with the optical fiber is introduced into the connector 10 through a kink preventer by being inserted into the rear, first opening 23. From the front, second opening 25 there protrudes from the interior of the connector 10 a ferrule 24, in the central bore of which the end of the optical fiber 26 is accommodated (FIG. 3). For further details of the internal structure, reference should be made to the configuration given by way of example in FIGS. 13 and 14 of the initially cited U.S. Pat. No. 6,142,676.

Formed onto the housing 16 at the rear end of the connector 10 is a latching arm 15, which extends forward, parallel to the connector axis 27, and can be bent elastically against the housing 16. The latching arm 15 bears on its front, free end a latching hook 14, with which it engages behind a latching edge in the coupling belonging to the connector 10 when the connector is inserted into the coupling.

At the front end of the connector 10, a cover 17 is arranged pivotably about a pivoting axis 19 on the housing 16 by means of two pivoting arms 32, 33. In the closed state (FIG. 1), the cover 17 closes the front, second opening 25 and so protects the end face of the optical fiber 26 from soiling and damage. At the same time, laser light from the optical fiber 26 is prevented from being able to penetrate to the outside and damage the eye of a viewer. When the connector 10 is inserted into the coupling, the cover 17 is pivoted from the completely closed, first position, represented in FIG. 1, into the completely opened, second position, represented in FIG. 3, by an interaction between various actuating elements on the cover 17 and in the coupling. This takes place by a lug which is laterally attached in the coupling pressing against a first engagement surface 18, which is formed laterally on the pivoting arms 32, 33 and above the pivot axis 19. Lying opposite the first engagement surface 18 is a second engagement surface 18', with which the lug of the coupling comes into engagement when the connector 10 is pulled out again from the coupling, and consequently pivots the cover 17 back again into the closed position. In the completely opened, second position of FIG. 3, the cover 17 butts against a stop 12, which is formed on the housing 16 like a dorsal fin and has at the front end a stop face 20 (FIG. 1) adapted to the shape of the cover.

According to the invention, the connector 10 is then provided with spring means, which include a leaf spring 11. In principle, it is conceivable to form the leaf spring on the housing 16 as an integral part of the housing 16. This would reduce the assembly effort to a minimum. In the embodiment of FIGS. 1 to 3, the leaf spring 11 is formed as a separate planar spring, comprising a metal sheet with good spring properties, which is fastened to the housing 16 of the connector 10. For this purpose, a planar supporting surface 21, which lies parallel to the connector axis 27 and on which the leaf spring 11 rests with the underside, is formed on the housing 16. Laterally projecting hold-down devices 13, which hold the leaf spring 11 down on the supporting surface 21, are formed on the stop above the leaf spring 11. The hold-down devices 13 extend outward, parallel to the supporting surface 21, and are rounded off on the underside, in order on the one hand to facilitate assembly and on the other hand to facilitate resilient bending of the leaf spring 11. The supporting surface 21 is bounded to the rear by a first offset 28, which prevents displacement of the leaf spring 11 to the rear. A second offset 29 in the front region of the connector 10 prevents displacement of the leaf spring 11 to the front. The leaf spring 11 is fixed against lateral displacement by the stop 12, which is received by a corresponding slit-like clearance 30 in the leaf spring 11. The clearance 30 is open to the rear and has a funnel-shaped widening 31 at the open end, so that, to the rear, the leaf spring 11 has the shape of a two-pronged fork. The formation of the leaf spring 11 itself and the special type of fastening to the housing 16 makes the assembly of the leaf spring 11 very easy: with the cover 17 closed, it is pushed in a sliding manner to the rear on the supporting surface 21 with the side formed as a fork engaging around the stop 12, it moving with the two prongs of the fork under the hold-down devices 13. At the end of the pushing-in operation, the leaf spring 11 engages between the two offsets 28 and 29.

The interaction of the leaf spring 11 with the pivotable cover 17 can best be seen in FIG. 2: formed on the cover 17 are the two pivoting arms 32, 33, which engage laterally around the housing 16, and by means of which the cover 17 is pivotably mounted at the pivot axis 19. The leaf spring 11 comes to lie in a free space between the pivoting arms 32, 33. Formed on the inner sides of the pivoting arms 32, 33 are inwardly protruding studs 22, on which the leaf spring 11 rests with the front, free end. The studs 22 are positioned in such a way that, when the cover 17 is closed (FIG. 1), and when the cover 17 is completely opened (FIG. 3), the leaf spring 11 lies with its free end virtually parallel to the supporting surface 21 and is only slightly deflected, in order to ensure that the cover 17 remains stably in the extreme positions. When the cover 17 pivots between these two extreme positions, the studs 22 define a circular path about the pivot axis 19, on which they elastically deflect or raise the free end of the leaf spring 11 until, according to FIG. 2, in a predetermined intermediate position in which the studs 22 are approximately vertically above the pivot axis 19, the maximum extend of the leaf spring 11 is reached. Before this intermediate position, the leaf spring 11 prestresses the cover 17 in the closing direction; behind the intermediate position, the leaf spring 11 presses the cover into the completely opened position of FIG. 3. The cover 17 with the formed-on pivoting arms 32, 33 may be produced from a plastic. However, it is also conceivable to form the cover and the pivoting arms from a metal, in order to safely shield laser radiation emerging from the optical fiber 26 even in the case of higher intensities. In this case, it is expedient to set the inner side of the cover 17 obliquely in relation to the optical axis of the optical fiber 26, in order to avoid reflection of the radiation back into the fiber.

Figure 4:
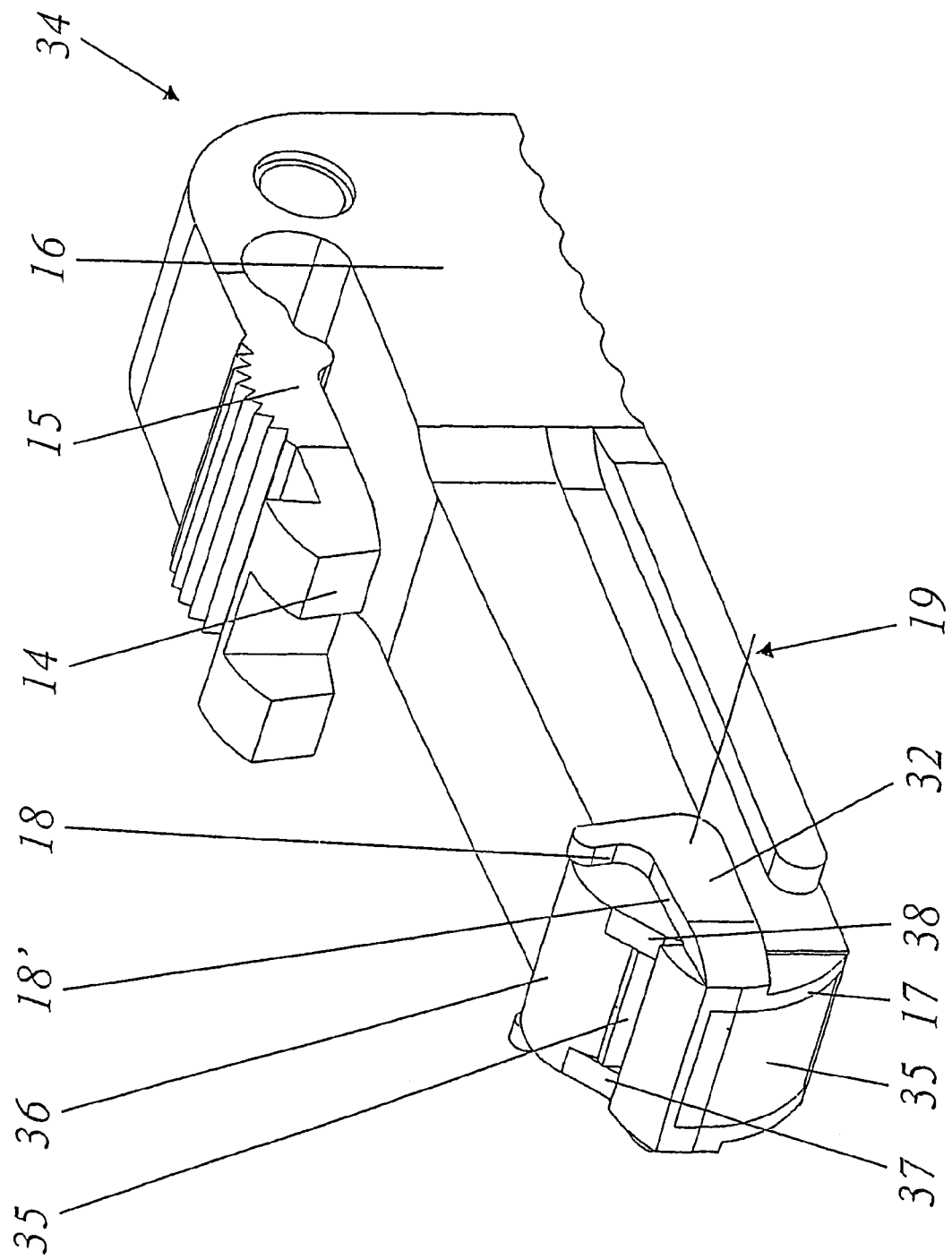
FIG. 4 shows in a representation comparable to FIG. 1 another preferred exemplary embodiment of a connector according to the invention, in which the leaf spring is arranged in the cover itself.

Another exemplary embodiment of an optical connector according to the invention is reproduced in FIG. 4. The connector 34 has a housing 16 which is comparable to the connector 10 from FIG. 1, with a comparable latching arm 15 and latching hook 16 for latching in the coupling. In the case of this exemplary embodiment, too, the cover 17 which can pivot about a transversely lying pivot axis 19 is arranged at the front end of the connector 34. Formed in turn on the cover 17 are pivoting arms, only one pivoting arm 32 of which can be seen. The engagement surfaces 18 and 18' have the function already described further above in connection with FIG. 1. The prestress of the cover in the closing direction is undertaken here by a leaf spring 35, which is fastened to the cover 17 itself. The leaf spring 35 is bent like a V. With one leg of the V, it is pushed into a clearance on the front side of the cover 17 and held in this way. The other, free leg of the V protrudes upward between the cover 17 and the end face of the housing 16 and undertakes the spring function. It is laterally guided by two bounding walls 37, 38 formed onto the housing 16.

When the cover 17 is swung open from the closed position shown in FIG. 4, the leaf spring 35 is pivoted along with it. The free leg of the leaf spring 35 slides along on an outwardly curved sliding surface 36 of the housing 16. This sliding surface 36 is designed in its curvature in such a way that the spring stress of the leaf spring 35 increases as the cover 17 swings open. A prestress in the closing direction is correspondingly obtained for the cover 17. If the curvature of the sliding surface 36 is additionally designed in such a way that the spring stress decreases again toward the end of the swinging-open operation, a bistable behavior is obtained in the same way as in the case of the exemplary embodiment of FIG. 1, i.e. the cover reaches a stable end position with corresponding spring prestressing both when it is completely closed and when it is completely opened.

The advantage of the spring configuration shown in FIG. 4 is obvious in particular for those connectors in which laser radiation can emerge with relatively great power from the end of the optical fiber. When the cover 17 is closed, the (metallic) leaf spring 35 is located here directly in the path of rays of the optical fiber and effectively blocks the light emerging from the optical fiber. If, in addition, the part of the leaf spring 35 that lies in the path of rays of the optical fiber 26 when the cover 17 is closed is set obliquely in relation to the optical axis of the optical fiber 26 in such a way that radiation impinging on the leaf spring 35 from the optical fiber is not reflected back into the optical fiber, the further advantage is obtained that reflection-related interferences in a circuit connected to the optical fiber are reliably avoided when the cover 17 is closed. The shielding of the laser radiation emerging from the optical fiber can be improved still further if metal inserts which intercept the laterally emerging radiation are provided laterally on the inner side in the cover 17.

The invention claimed is:

1. An optical connector for connecting optical fibers, with a housing and a cover, wherein the housing comprises:
   a first opening for connecting an optical cable with an optical fiber thereto;
   a second opening through which an end of the optical fiber protrudes outward from the housing, wherein the second opening is configured to be closed by the cover, wherein the cover is configured to be pivoted about a pivoting axis between a first position, wherein the cover closes the second opening and a second position, wherein the cover frees the second opening; and
   spring means for prestressing the cover in a closing direction, wherein the spring means comprise a leaf spring, wherein a free end of the leaf spring presses on the cover.

2. The connector as claimed in claim 1, wherein the leaf spring includes a first end and a second end, wherein the first end is restrained on the housing and wherein the second end of the leaf spring is free and is arranged in relation to the cover so that during the pivoting of the cover from the first position into the second position, the leaf spring is bent with the second end out of a position of rest and extending upwardly.

3. The connector as claimed in claim 2, wherein the optical fiber in the connector runs parallel to a connector axis, wherein the cover is configured to be pivoted about a pivot axis lying transversely in relation to the connector axis, and wherein the leaf spring in a position of rest on the housing rests on a supporting surface, wherein the surface is oriented perpendicularly in relation to the pivot axis.

4. The connector as claimed in claim 3, wherein the supporting surface runs parallel to the connector axis.

5. The connector as claimed in claim 3, further comprising actuating elements arranged on the cover, wherein the actuating elements define a circular path during pivoting of the cover and wherein the leaf spring rests with the second end on the actuating elements and is deflected by the actuating elements when the cover is pivoted from the first position into the second position.

6. The connector as claimed in claim 3, further comprising actuating elements arranged on the cover so that a maximum deflection of the leaf spring is achieved when the cover is in a predetermined pivoting position, wherein the predetermined pivoting position lies between the first position and the second position, and wherein the cover is pressed into the second position by the leaf spring when the cover has exceeded the predetermined pivoting position while moving from the first position.

7. The connector as claimed in claim 3, wherein the leaf spring rests with the first end on the supporting surface on the housing and is held down on the supporting surface by hold-down devices arranged above the supporting surface on the housing and extending parallel to the supporting surface.

8. The connector as claimed in claim 7, wherein the leaf spring is configured to be pushed in between the supporting surface and the hold-down devices.

9. The connector as claimed in claim 7, further comprising actuating elements arranged on the cover, wherein the actuating elements define a circular path during pivoting of the cover and wherein the leaf spring rests with the second end on the actuating elements and is deflected by the actuating elements when the cover is pivoted from the first position into the second position.

10. The connector as claimed in claim 7, wherein the leaf spring is secured on the supporting surface by fixing means to prevent lateral displacement.

11. The connector as claimed in claim 10, wherein the fixing means comprise two offsets in the housing, wherein the offsets prevent movement of the leaf spring in the direction of the connector axis.

12. The connector as claimed in claim 10, wherein the fixing means comprise a stop for the cover, wherein the stop protrudes perpendicularly upward out of the center of the supporting surface and extends in a direction of the connector axis, wherein the leaf spring has a slit-like clearance, wherein the slit-like clearance includes an open side and receives the stop when the leaf spring is inserted into the housing, and wherein the hold-down devices are arranged laterally on the stop.

13. The connector as claimed in claim 12, wherein the slit-like clearance in the leaf spring has a funnel-shaped widening toward the open side.

14. The connector as claimed in claim 2, further comprising actuating elements arranged on the cover, wherein the actuating elements define a circular path during pivoting of the cover and wherein the leaf spring rests with the second end on the actuating elements and is deflected by the actuating elements when the cover is pivoted from the first position into the second position.

15. The connector as claimed in claim 14, wherein the actuating elements are arranged on the cover so that a maximum deflection of the leaf spring is achieved when the cover is in a predetermined pivoting position, wherein the predetermined pivoting position lies between the first position and the second position, and wherein the cover is pressed into the second position by the leaf spring when the cover has exceeded the predetermined pivoting position while moving from the first position.

16. The connector as claimed in claim 1, wherein the leaf spring is fixedly arranged with one end in the cover, whereby during the pivoting of the cover, the leaf spring slides with a free end along on a sliding surface formed on the housing so that the cover is prestressed in the closing direction.

17. The connector as claimed in claim 16, wherein the leaf spring is fastened to the cover so that when the cover is closed, the cover intercepts radiation emerging from the optical fiber.

18. The connector as claimed in claim 17, wherein metal inserts for intercepting laterally emerging radiation are situated laterally on an inner side in the cover.

19. The connector as claimed in claim 17, wherein a part of the leaf spring that lies in the path of rays of the optical fiber when the cover is closed, is set obliquely in relation to the optical axis of the optical fiber so that radiation impinging on the leaf spring from the optical fiber is not reflected back into the optical fiber.

20. The connector as claimed in claim 19, wherein metal inserts for intercepting laterally emerging radiation are situated laterally on an inner side in the cover.

21. An optical connector for connecting optical fibers, with a housing, wherein the housing comprises:
   a first opening for connecting an optical cable with an optical fiber thereto;
   a second opening through which an end of the optical fiber protrudes outward from the housing, wherein the second opening is configured to be closed by a cover, wherein the cover is configured to be pivoted about a pivoting axis between a first position, wherein the cover closes the second opening and a second position, wherein the cover frees the second opening; and
   spring means for prestressing the cover in a closing direction, wherein the spring means comprise a leaf spring, wherein the leaf spring includes a first end and a second end, wherein the first end is restrained on the housing and wherein the second end of the leaf spring is free and presses on the cover, wherein the second end is arranged in relation to the cover so that during the pivoting of the cover from the first position into the second position, the leaf spring is bent with the second end out of a position of rest and extending upwardly, wherein the optical fiber in the connector runs parallel to a connector axis, wherein the cover is configured to be pivoted about a pivot axis lying transversely in relation to the connector axis, and wherein the leaf spring in a position of rest on the housing rests on a supporting surface, wherein the surface is oriented perpendicularly in relation to the pivot axis and the surface runs parallel to the connector axis, wherein the leaf spring rests with the first end on the supporting surface on the housing and is held down on the supporting surface by hold-down devices arranged above the supporting surface on the housing and extending parallel to the supporting surface.

22. An optical connector for connecting optical fibers, with a housing, wherein the housing comprises:
- a first opening for connecting an optical cable with an optical fiber thereto;
- a second opening through which an end of the optical fiber protrudes outward from the housing, wherein the second opening is configured to be closed by a cover wherein the cover is configured to be pivoted between a first position, wherein the cover closes the second opening and a second position, wherein the cover frees the second opening; and
- spring means for prestressing the cover in a closing direction, wherein the spring means comprise a leaf spring, wherein the leaf spring is fixedly arranged with one end in the cover, whereby during the pivoting of the cover, the leaf spring slides with a free end along on a sliding surface formed on the housing so that the cover is prestressed in the closing direction, wherein the leaf spring is fastened to the cover so that when the cover is closed, the cover intercepts radiation emerging from the optical fiber, and further wherein a part of the leaf spring that lies in the path of rays of the optical fiber when the cover is closed, is set obliquely in relation to the optical axis of the optical fiber so that radiation impinging on the leaf spring from the optical fiber is not reflected back into the optical fiber.

23. An optical connector for connecting optical fibers, with a housing, wherein the housing comprises:
- a first opening for connecting an optical cable with an optical fiber thereto;
- a second opening through which an end of the optical fiber protrudes outward from the housing, wherein the second opening is configured to be closed by a cover wherein the cover is configured to be pivoted between a first position, wherein the cover closes the second opening and a second position, wherein the cover frees the second opening; and
- spring means for prestressing the cover in a closing direction, wherein the spring means comprise a leaf spring, wherein the leaf spring is fixedly arranged with one end in the cover, whereby during the pivoting of the cover, the leaf spring slides with a free end along on a sliding surface formed on the housing so that the cover is prestressed in the closing direction, wherein the leaf spring is fastened to the cover so that when the cover is closed, the cover intercepts radiation emerging from the optical fiber, and further wherein metal inserts for intercepting laterally emerging radiation are situated laterally on an inner side in the cover.

* * * * *